L. GIRODO.
ACETYLENE GENERATOR.
APPLICATION FILED OCT. 14, 1918.

1,313,810.

Patented Aug. 19, 1919.

Louis Girodo
Inventor

UNITED STATES PATENT OFFICE.

LOUIS GIRODO, OF LONDON, ENGLAND, ASSIGNOR TO FALLOLITS LIMITED, OF WESTMINSTER, ENGLAND.

ACETYLENE-GENERATOR.

1,313,810.  Specification of Letters Patent.  Patented Aug. 19, 1919.

Application filed October 14, 1918. Serial No. 258,057.

*To all whom it may concern:*

Be it known that I, LOUIS GIRODO, a subject of the King of Italy, residing at 27 Noel street, Wardour street, London, England, have invented new and useful Improvements in Acetylene-Generators, of which the following is a specification.

This invention relates to acetylene generators and more particularly to a feed connection between the water reservoir and the carbid container.

It is the object of the invention to prevent irregular and undue passage of water from the water reservoir into the carbid chamber when the generator is subjected to severe jolting or jarring when used, for instance, on automobiles.

For a fuller understanding of the invention reference is had to the appended drawings in which—

Figure 1:
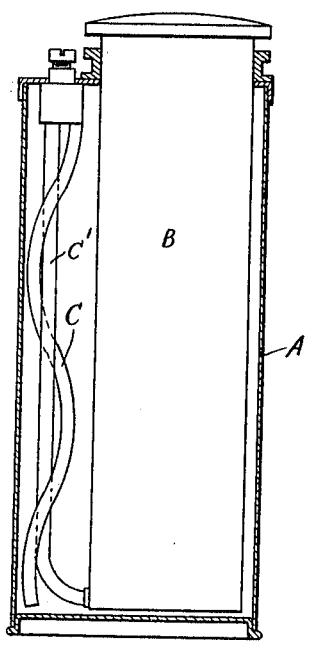
Figure 1 is a vertical section through an acetylene generator embodying the invention.

In the drawings A represents the water vessel and B the carbid chamber positioned in the water vessel and extending substantially to the bottom thereof. The feed connection, which is of the siphon type, comprises a branch C rising from near the bottom of the water vessel A substantially to the top thereof and a return branch C' forming a continuation of branch C and connected to the carbid chamber B near the bottom thereof. The rising branch C is given a tortuous form to prevent rapid movement of the water therethrough.

Figure 2:
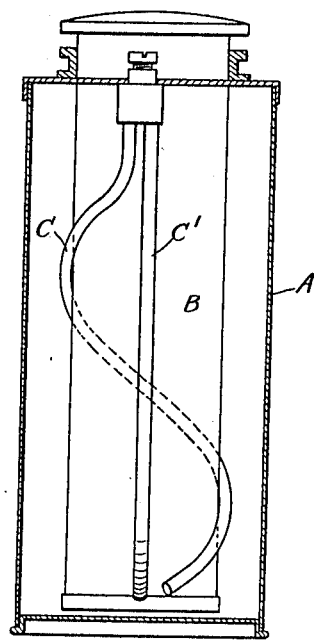
Fig. 2 is a similar section showing a modification.
Figure 3:
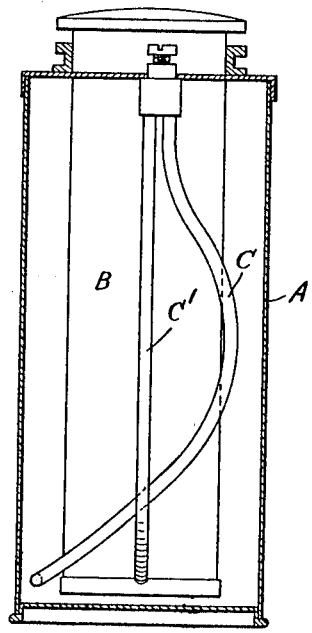
Fig. 3 is a similar section showing another modification.

In Fig. 1 the rising branch C is arranged spirally about the return branch C'. In Fig. 2, the branch C is arranged spirally about the carbid chamber. In Fig. 3, the branch C encircles one half of the carbid chamber and then returns on the same side thereof to meet the upper end of the down branch C'.

I have found that in this manner the body of water in the branch C is substantially prevented from responding to jolts and jars tending to cause an excessive flow of water to the carbid chamber.

While the forms of feed connection are particularly adapted for carrying out the object of the invention, various changes may obviously be made within the scope of the disclosure.

I claim:—

1. In an acetylene generator, in combination with a water-vessel and a carbid-chamber contained therein, a feed pipe of the siphon type for establishing a feed connection from near the bottom of the water-vessel to the bottom of the carbid-chamber, the rising branch of the pipe being curved to define a tortuous path for the ascending water.

2. In an acetylene generator, in combination with a water-vessel and a carbid-chamber contained therein, a feed pipe of the siphon type for establishing a feed connection from near the bottom of the water-vessel to the bottom of the carbid-chamber, the rising branch of the pipe being spirally twisted to define a tortuous path for the ascending water.

3. In an acetylene generator, in combination with a water-vessel and a carbid-chamber contained therein, a feed pipe of the siphon type for establishing a feed connection from near the bottom of the water-vessel to the bottom of the carbid-chamber, the rising branch of the pipe being spirally twisted about the descending branch to define a tortuous path for the ascending water.

LOUIS GIRODO.

Copies of this patent may be obtained for five cents each, by addressing the "Commissioner of Patents, Washington, D. C."